(12) United States Patent
Ballard et al.

(10) Patent No.: US 10,938,640 B2
(45) Date of Patent: Mar. 2, 2021

(54) SYSTEM AND METHOD OF MANAGING AN INTELLIGENT PERIPHERAL

(71) Applicant: DELL PRODUCTS, LP, Round Rock, TX (US)

(72) Inventors: Lee Eric Ballard, Georgetown, TX (US); Elie A. Jreij, Pflugerville, TX (US); Robert T. Stevens, IV, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 114 days.

(21) Appl. No.: 16/171,352

(22) Filed: Oct. 25, 2018

(65) Prior Publication Data

US 2020/0136901 A1 Apr. 30, 2020

(51) Int. Cl.
| | | |
|---|---|---|
| *G06F 15/177* | (2006.01) |
| *H04L 12/24* | (2006.01) |
| *H04L 29/06* | (2006.01) |
| *G06F 9/4401* | (2018.01) |
| *H04L 12/46* | (2006.01) |
| *G06F 9/455* | (2018.01) |

(52) U.S. Cl.
CPC ........ *H04L 41/0806* (2013.01); *G06F 9/4411* (2013.01); *G06F 9/45558* (2013.01); *H04L 12/4633* (2013.01); *H04L 41/0246* (2013.01); *H04L 63/18* (2013.01); *G06F 2009/45587* (2013.01); *G06F 2009/45595* (2013.01)

(58) Field of Classification Search
CPC ... H04L 12/12; H04L 12/66; H04L 29/08089; H04L 41/0809; H04L 67/025; H04L 41/22

USPC .......................................................... 709/220
See application file for complete search history.

(56) References Cited

U.S. PATENT DOCUMENTS

| | | | |
|---|---|---|---|
| 10,075,398 B2 | 9/2018 | Ballard et al. |
| 2007/0226377 A1 | 9/2007 | Jreij et al. |
| 2008/0282117 A1 | 11/2008 | Partani et al. |
| 2009/0100194 A1 | 4/2009 | Bhadri et al. |
| 2010/0005190 A1* | 1/2010 | Shah .................. H04L 41/0273 709/235 |
| 2012/0154375 A1* | 6/2012 | Zhang .................. G06F 9/4411 345/419 |
| 2014/0222945 A1 | 8/2014 | Noronha et al. |
| 2014/0281894 A1 | 9/2014 | Maity et al. |

\* cited by examiner

*Primary Examiner* — Wing F Chan
*Assistant Examiner* — Andrew Woo
(74) *Attorney, Agent, or Firm* — Larson Newman, LLP (57) ABSTRACT

An information handling system includes a host, an intelligent peripheral connected to the host, and a baseboard management controller. The host includes a memory and a central processing unit. The intelligent peripheral is configured to communicate with the baseboard management controller to obtain configuration information, and provide networking services to the host after configuration. The baseboard management controller is configured to communicate with a management network; establish a communication channel with the intelligent peripheral independent of the host system; obtain configuration information for the intelligent peripheral from the management network; and provide the configuration information to the intelligent peripheral.

18 Claims, 7 Drawing Sheets

SYSTEM AND METHOD OF MANAGING AN INTELLIGENT PERIPHERAL

FIELD OF THE DISCLOSURE

The present disclosure generally relates to information handling systems, and more particularly relates to managing an intelligent peripheral.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system can include a host, an intelligent peripheral connected to the host, and a baseboard management controller. The host can include a memory and a central processing unit. The intelligent peripheral can be configured to communicate with the baseboard management controller to obtain configuration and information, and provide networking services to the host after configuration. The baseboard management controller can communicate with a management network; establish a communication channel with the intelligent peripheral independent of the host system; obtain configuration information for the intelligent peripheral from the management network; and provide the configuration information to the intelligent peripheral.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
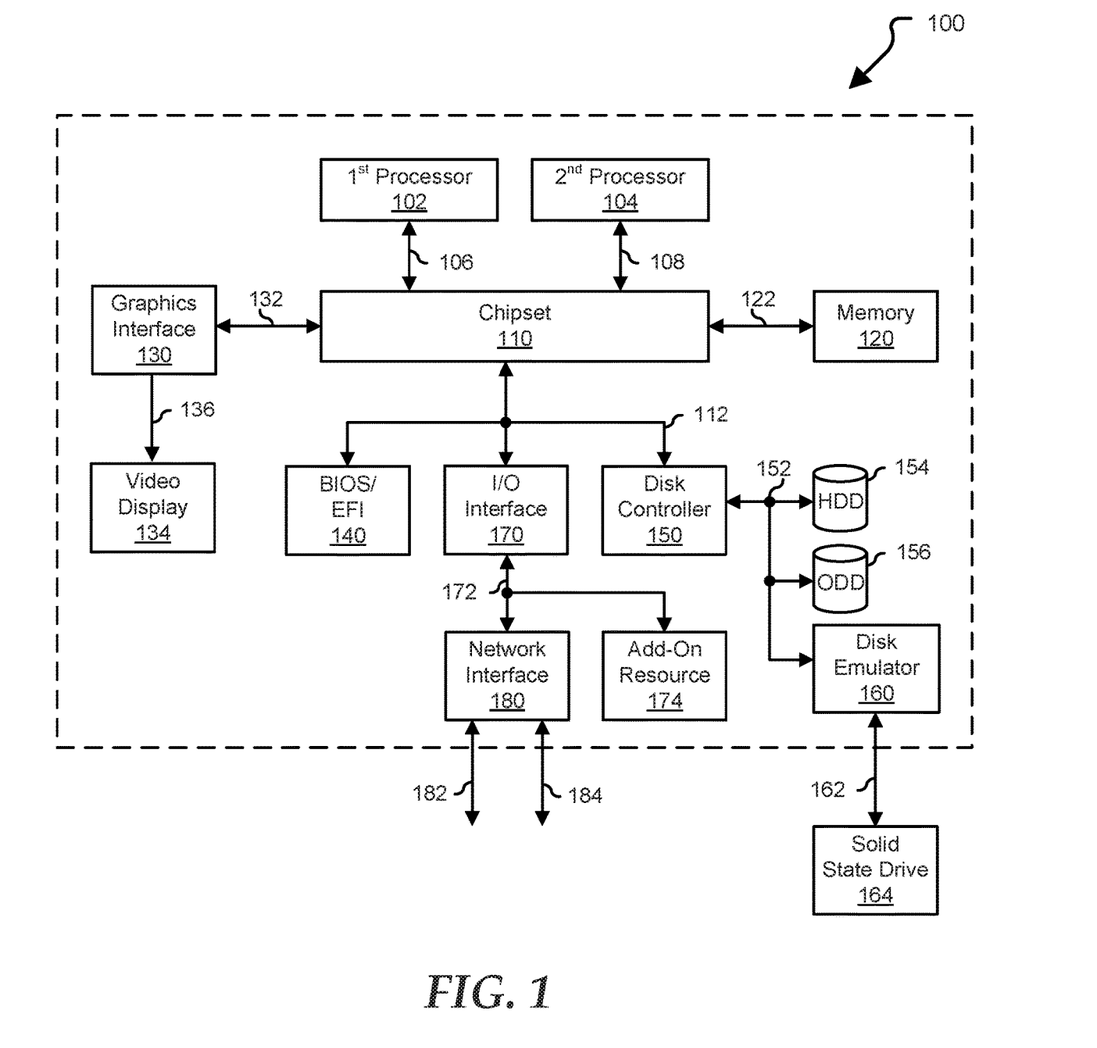
FIG. 1 is a block diagram illustrating an information handling system according to an embodiment of the present disclosure.

FIG. 1 illustrates a generalized embodiment of information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Intelligent peripherals have the ability to perform tasks independently and without the supervision of the host computer. In various embodiments, the intelligent peripheral can include a memory, a processor for performing operations, interfaces for communicating with the host computer, such as a PCIe interface, and external communications interfaces, such as Ethernet, USB, SATA, Firewire, and the like. The intelligent peripheral can also include one or more interfaces for communicating with a BMC, such as SMBUS, USB, dedicated Ethernet, NC-SI, and the like. One example of an intelligent peripheral is an intelligent network interface controllers (SmartNICs) which can offload CPU intensive network operations from the host. These operations can include all the network edge operations classically done in a top-of-rack (TOR) switch hardware or hypervisor vSwitch software, such as firewall, network address translation, metering, encryption, tunneling, load balancing, and access control lists. Beyond offload, a smartNIC may replace the security and management functions of the hypervisor. In this way, bare metal servers can be managed like virtual machines. Attacks that would compromise a hypervisor can be mitigated by the smartNIC. The smartNIC can isolate a compromised server and protect the core network. Generally, a smartNIC that provides management and security independent of the server can be managed from the network. However, managing a smartNIC from the network presents several issues. To avoid attaching the smartNIC to the management network in an insecure, unconfigured state, the initial configuration of the smartNIC would need to be performed prior to attaching to the management network. Additionally, the smartNIC may not have a dedicated management network port. Without a dedicated management network port, it may not be possible to physically separate the management traffic from the workload traffic.

Figure 2:
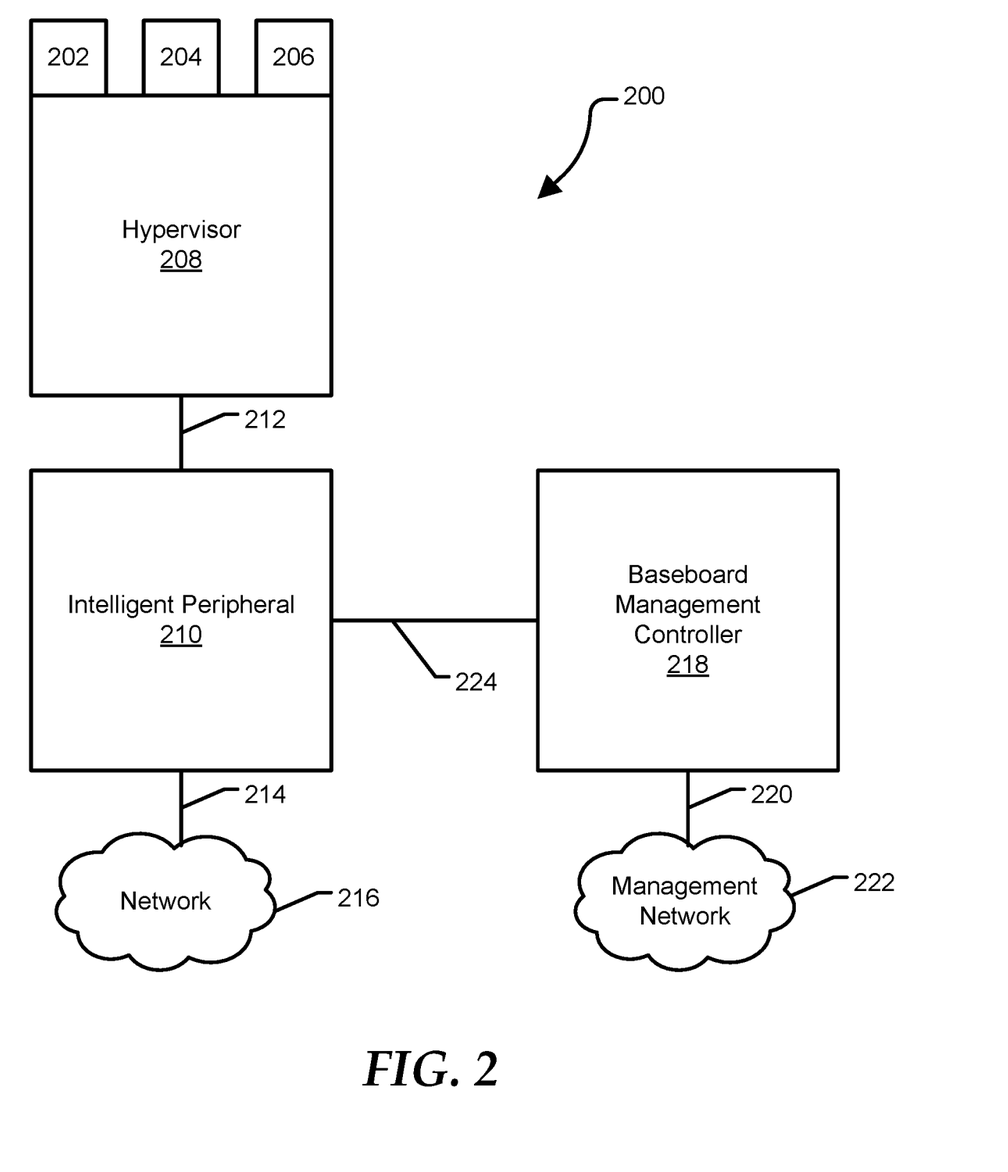
FIG. 2 is a schematic diagram illustrating an exemplary system with BMC pass-through controller of an intelligent peripheral.

FIG. 2 shows a server 200 including virtual machines 202, 204, and 206 managed by a hypervisor 208. The server can also include an intelligent peripheral 210 with a connection 212 to the hypervisor 208 and a connection 214 to a network 216 and a BMC 218 with a connection 220 to a management network 222. The intelligent peripheral 21 can secure connections 212 and 214 with a firewall and hypervisor 208 can secure connection 220 with a firewall. Additionally, the BMC 218 can have a connection 224 to the intelligent peripheral 210. Connection 224 can be via a system management bus (SMBUS), a network controller sideband interface (NC-SI), universal serial bus (USB), a dedicated internal Ethernet connection, other similar connection protocols, or any combination thereof. In a default configuration, the intelligent peripheral can be configured to block all traffic to and from the hypervisor 208 and the network 216. However, connection 224 between the BMC and the intelligent peripheral, such as via the SMBUS may not be blocked.

Once configured, such as via the baseboard management, the intelligent peripheral can provide services to the hypervisor and virtual machines. When the intelligent peripheral is a smartNIC, the intelligent peripheral can provide network services to the hypervisor and virtual machines, including firewall, network address translation, metering, encryption, tunneling, load balancing, access control, and the like.

Figure 3:
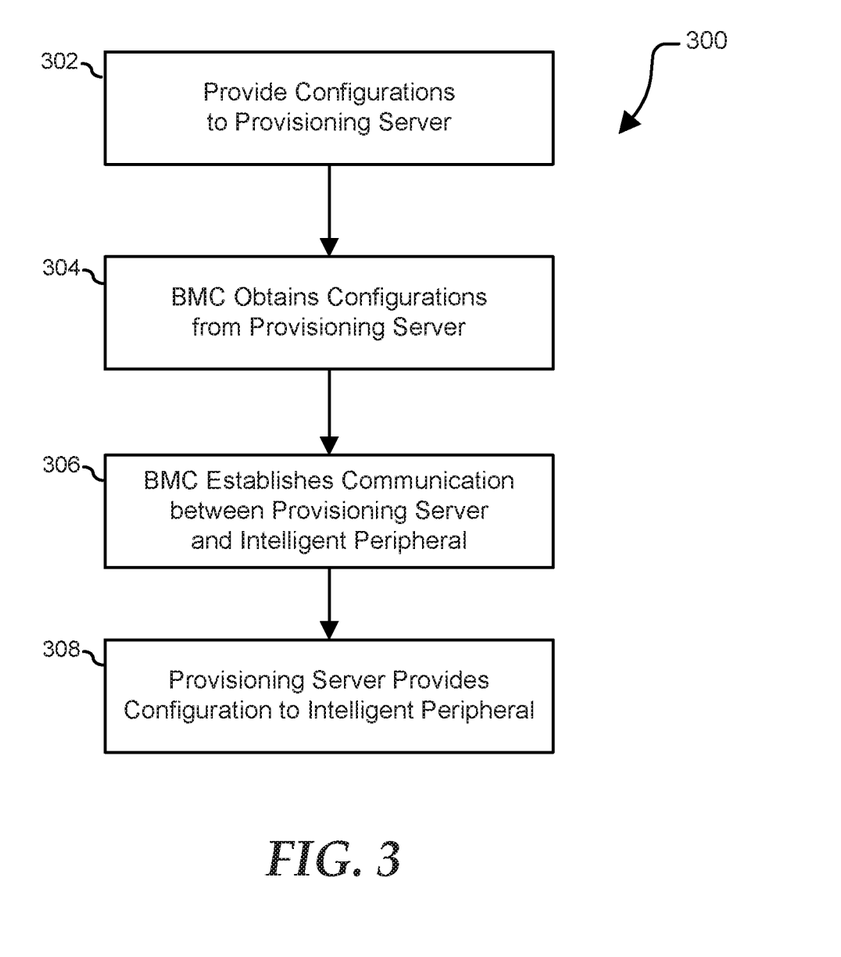
FIG. 3 is a flow chart illustrating an exemplary method of configuring an intelligent peripheral through the BMC.

FIG. 3 illustrates a method 300 of configuring an intelligent peripheral, such as a smartNIC. At 302, a provisioning server can be loaded with configuration files for the BMC and the intelligent peripheral. The BMC configuration files can include information about which mode of communication can be used between the intelligent peripheral and the provisioning server, such as establishing an Ethernet bridge through the BMC so that the intelligent peripheral can communicate with the provisioning server, routing network traffic between the intelligent peripheral and the provision server, passing data packets between the provisioning server and the intelligent peripheral. At 304, such as when the server is connected to power, the BMC can obtain configuration files from the provisioning server. In various embodiments, the BMC can also obtain initial configuration information for the intelligent peripheral. At 306, such as when the server is powered on, the intelligent peripheral can connect to the BMC, such as through the SMBUS, USB, or dedicated Ethernet connection, and the BMC can establish communication between the provisioning server and the intelligent peripheral. In various embodiments, the BMC can provide initial configuration information to the intelligent peripheral before providing communication to the provisioning server. At 308, the provisioning server can provide configuration information to the intelligent peripheral through the BMC communication channel. Once configured, the intelligent peripheral can provide services to the host server.

Figure 4:
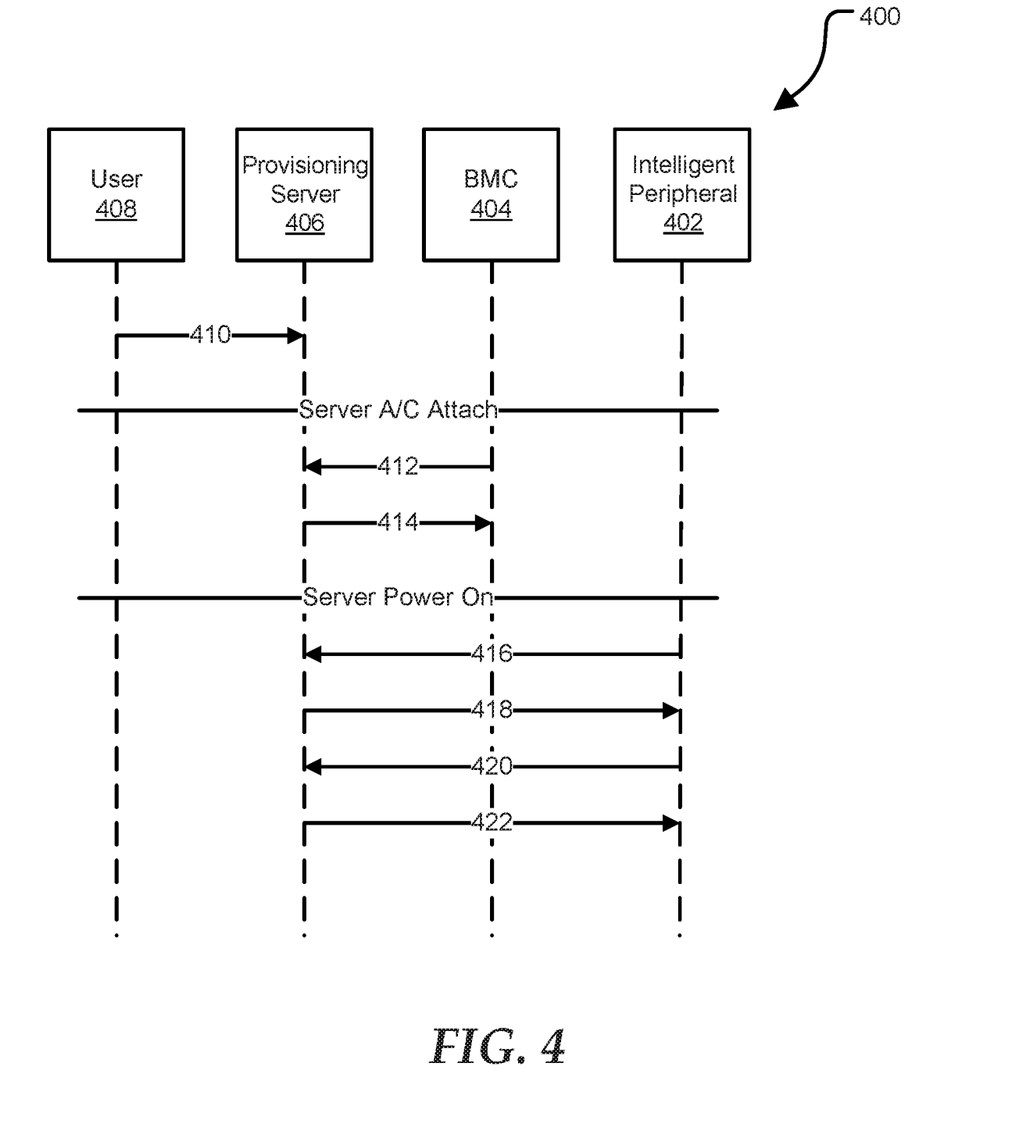
FIGS. 4-7 are diagrams illustrating various methods of controlling an intelligent peripheral through the BMC.

FIG. 4 illustrates a method 400 of configuring an intelligent peripheral 402 using a BMC 404 as a bridge to a management network. Using the BMC 404 as a bridge, the intelligent peripheral 402 can obtain configuration information from a provisioning server 406. In various embodiments, the BMC can create a bridge to the management network as described in more detail in U.S. patent application Ser. No. 14/757,625 entitled "Systems and Methods for Enabling a Host System to use a Network Interface of a Management Controller" by Lee E. Ballard et al., filed on Dec. 23, 2015 (now U.S. Pat. No. 10,075,398), which is incorporated by reference herein. A user 408 can upload configuration templates to a provisioning server 406, as indicated by 410. The configuration templates can include a server configuration, a BMC configuration, and an intelligent peripheral configuration. After the server is attached to power, the BMC 404 can discover the provisioning server (at 412) and receive the BMC configuration enabling the bridge (at 414). In various embodiments, the BMC can bridge an internal Ethernet connection with the intelligent peripheral to the dedicated management interface connected to the management network. The connection between the BMC and the intelligent peripheral can be an NC-SI sideband connection, a USB connection, a dedicated internal Ethernet connection, or the like. After the server is powered on, the intelligent peripheral 402 can utilize Dynamic Host Configuration Protocol (DHCP) to obtain a network address on the management network (at 416) and to receive a Preboot eXecution Environment (PXE) boot file from the provisioning server (at 418). At 420, the intelligent peripheral can request (at 420) and receive (at 422) the firmware and configuration information.

Figure 5:
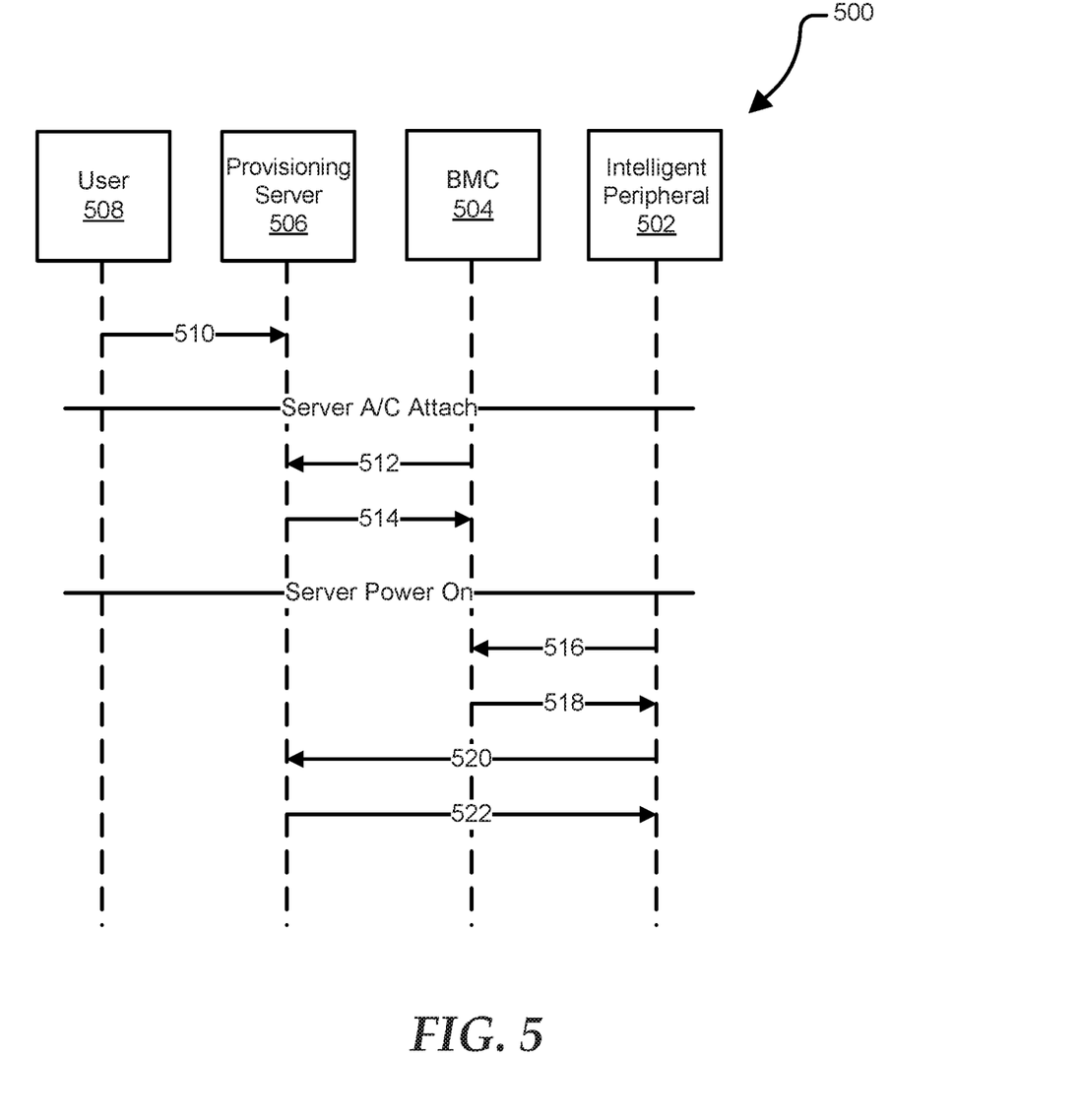

FIG. 5 illustrates a method 500 of configuring an intelligent peripheral 502 using a BMC 504 to provide network address translation (NAT) with DHCP or IPv6 stateless address auto-configuration (SLAAC). The NAT can allow the intelligent peripheral 502 to use the same IP address at the BMC 504, reducing the number of devices on the management network. Since the BMC 504 provides networking services to the intelligent peripheral 502, BMC 504 can pass user configurations to the intelligent peripheral 502, such as through DHCP options or DNS records. Using the BMC 504 as a router/firewall between the intelligent peripheral and the management network, the intelligent peripheral 502 can obtain configuration information from a provisioning server 506. A user 508 can upload configuration templates to a provisioning server 506, as indicated by 510. The configuration templates can include a server configuration, a BMC configuration, and an intelligent peripheral configuration. After the server is attached to power, the BMC 504 can discover the provisioning server (at 512) and receive the BMC configuration enabling the NAT (at 514). In various embodiments, the BMC can route an internal Ethernet connection with the intelligent peripheral to the dedicated management interface connected to the management network. The connection between the BMC and the intelligent peripheral can be an NC-SI sideband connection, a USB connection, a dedicated internal Ethernet connection, or the like. After the server is powered on, the intelligent peripheral 502 can utilize Dynamic Host Configuration Protocol (DHCP) to obtain a private internal network address from the BMC 504 (at 516) and to receive a Preboot eXecution Environment (PXE) boot file from the BMC 504 (at 518). The intelligent peripheral can request (at 520) and receive (at 522) the firmware and configuration information from the provisioning server 506 using BMC 504 as a router to connect to the management network and the provisioning server 506.

Figure 6:
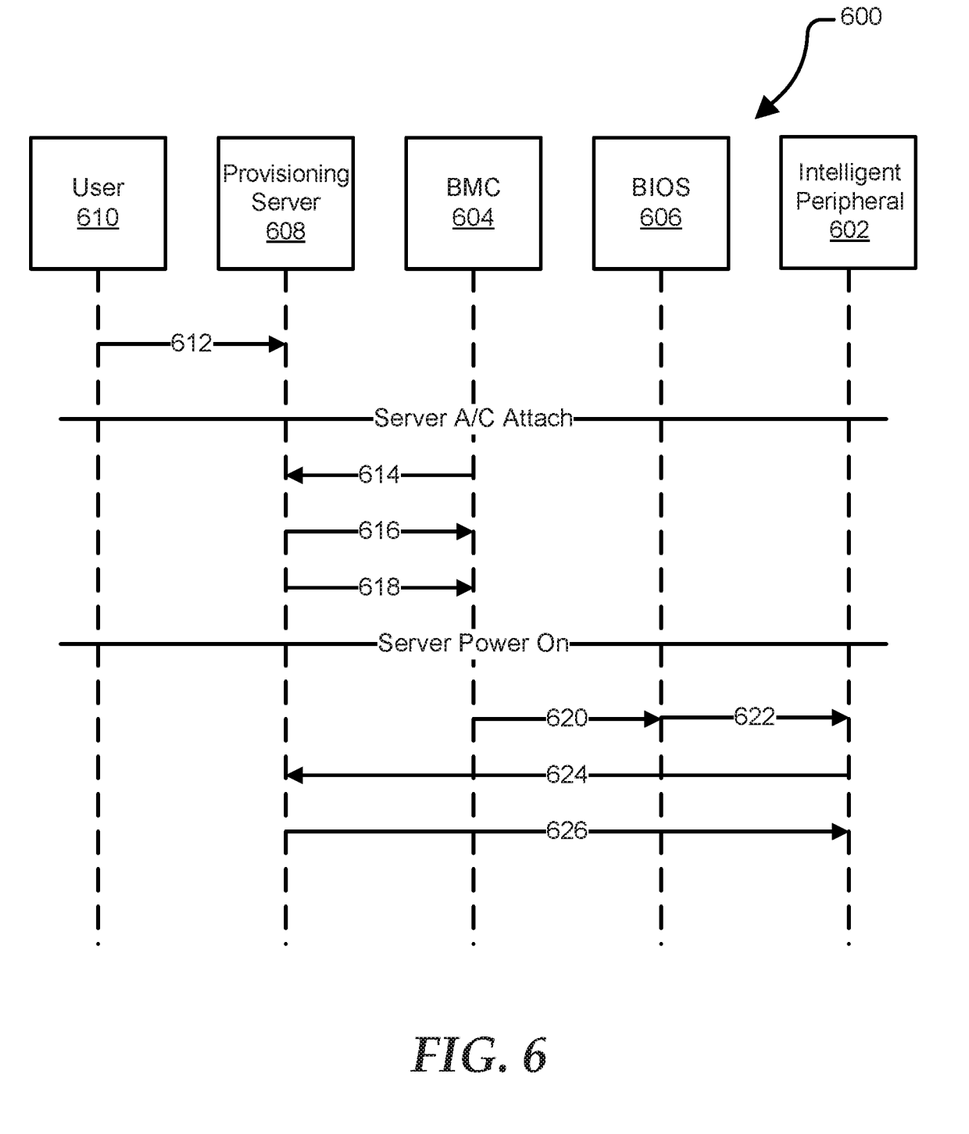

FIG. 6 illustrates a method 600 of configuring an intelligent peripheral 602 using a BMC 604 to provide network address translation (NAT) using Unified Extensible Firmware Interface (UEFI) Human Interface Infrastructure (HII) methods. The BMC 604 can provide basic configuration of the intelligent peripheral 602 through BIOS 606 using UEFI HII methods, and then the intelligent peripheral 602 can obtain additional configuration information from a provisioning server 608. A user 610 can upload configuration templates to a provisioning server 608, as indicated by 612. The configuration templates can include a server configuration, a BMC configuration, and an intelligent peripheral configuration. After the server is attached to power, the BMC 604 can discover the provisioning server (at 614) and receive the BMC configuration enabling the NAT (at 616). Additionally, the BMC can receive configuration information for the intelligent peripheral at 618. In various embodiments, the BMC can route an internal Ethernet connection with the intelligent peripheral to the dedicated management interface connected to the management network. The connection between the BMC and the intelligent peripheral can be an NC-SI sideband connection, a USB connection, a dedicated internal Ethernet connection, or the like. After the server is powered on, the BIOS 606 can receive configuration information from the BMC 604 (at 620) and provide configuration information to the intelligent peripheral 602 (at 622). These configurations can include configuration of the network settings, as well as credentials and certificates for secure communication. The intelligent peripheral can request (at 624) and receive (at 626) the firmware and additional configuration information from the provisioning server 608 using BMC 604 as a router to connect to the management network and the provisioning server 608.

Figure 7:
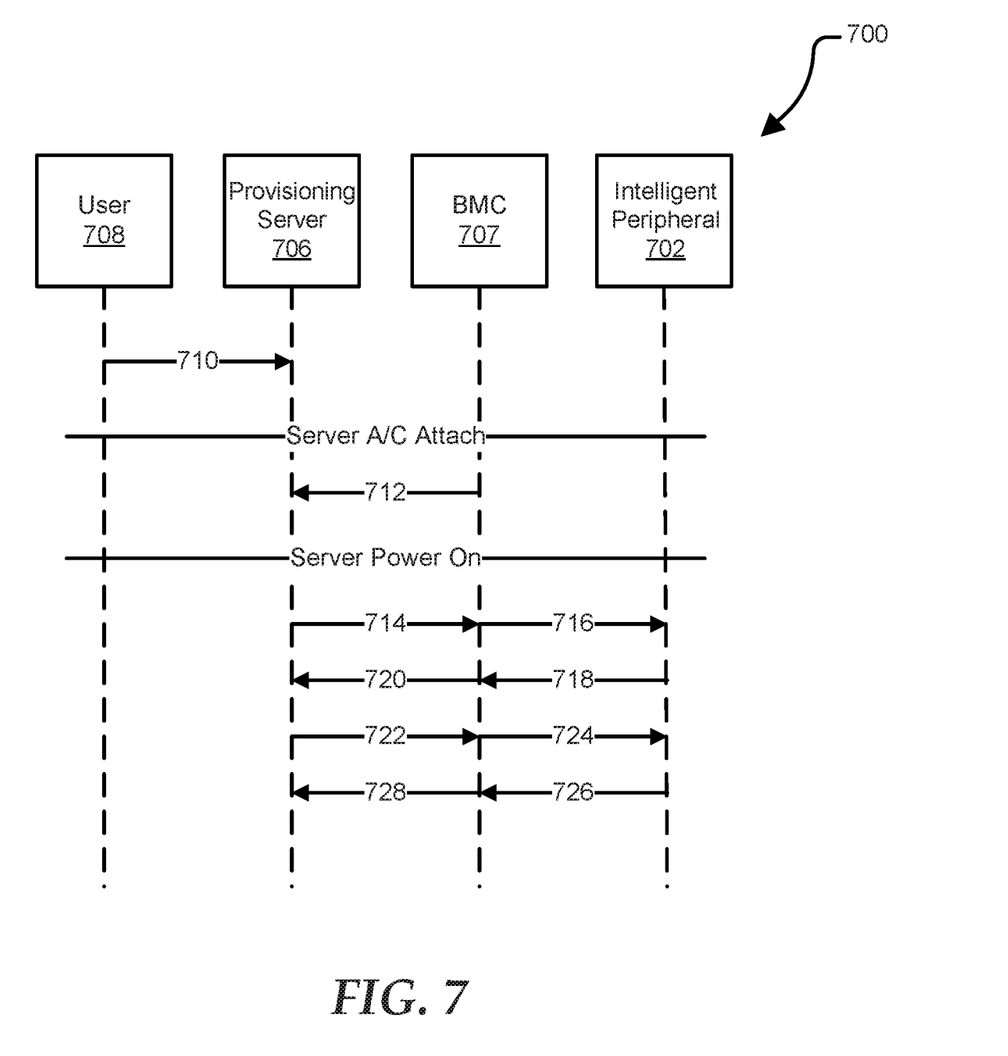

FIG. 7 illustrates a method 700 of configuring an intelligent peripheral 702 using NC-SI commands to transport blocks of data from a provisioning server 706 to the intelligent peripheral 702. The BMC 704 can use a pass-through mechanism so that BMC 704 may not need to understand the contents of the data passed between the provisioning server 706 and the intelligent peripheral 702. The size of each data block can be limited, such as by the size of an Ethernet frame, but multiple blocks can be grouped with a commit message to support larger configuration items such as certificates. Using this approach, the intelligent peripheral 702 may not have a network connection to the management network. A user 708 can upload configuration templates to a provisioning server 706, as indicated by 710. The configuration templates can include a server configuration, a BMC configuration, and an intelligent peripheral configuration. After the server is attached to power, BMC 704 can discover the provisioning server at 712. After the server is powered on, BMC 704 can receive configuration information for the intelligent peripheral 702 from the provisioning server (at 714) and pass the configuration information to the intelligent peripheral 702 (at 716). The intelligent peripheral can send a response, such as confirming the configuration was received and applied successfully, to BMC 704 (at 718) and BMC 704 can forward the information to the provisioning server 706 (at 720). The provisioning server 706 can send additional information to the intelligent peripheral, such as a request status information, by sending a message to BMC 704 (at 722) which BMC 704 can forward to the intelligent peripheral 702 (at 724). The intelligent peripheral 702 can respond by sending a message to BMC 704 (at 726) which the BMC can forward to the provisioning server 706 (at 728).

The disclosed system and methods can improve the security and operation of an information handling system. Verification of the measurement value provides an additional layer of authentication to protect from a compromise of the private key used to sign packages. Further, due to the decentralized and distributed ledger, modification of the ledger to insert a compromised transaction record would require compromising a majority of change management nodes, further minimizing the likelihood that a single actor or even a small group of actors to compromise the system.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions.

The term "computer-readable medium" shall also include any medium that is capable of storing, encoding or carrying a set of instructions for execution by a processor or that cause a computer system to perform any one or more of the methods or operations disclosed herein. In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   a host including a memory; and a central processing unit; and
   an intelligent peripheral connected to the host and configured to:
      communicate with a baseboard management controller to obtain configuration information; and
      provide networking services to the host after configuration;
   the baseboard management controller configured to:
      communicate with a management network separate from the networking services provided by the intelligent peripheral to the host;
      establish a communication channel with the intelligent peripheral independent of the host;
      obtain configuration information for the intelligent peripheral from the management network; and
      provide the obtained configuration information to the intelligent peripheral; and
      wherein the baseboard management controller is further configured to transport data blocks from the management network to the intelligent peripheral using the communication channel.

2. The system of claim 1, wherein the intelligent peripheral is a smart network interface controller.

3. The system of claim 1, wherein the communication channel is a network controller sideband interface.

4. The system of claim 1, wherein the baseboard management controller is further configured to act as a bridge between the communication channel and the management network.

5. The system of claim 4, wherein the baseboard management controller is further configured to provide initial configuration information to the intelligent peripheral through a Basic Input/Output System (BIOS) configuration interface.

6. The system of claim 4, wherein the baseboard management controller is further configured to provide initial configuration information to the intelligent peripheral through Dynamic Host Configuration Protocol (DHCP) or Domain Name System (DNS) services.

7. The system of claim 1, wherein the baseboard management controller is further configured to route network traffic between the communication channel and the management network.

8. The system of claim 1, wherein the intelligent peripheral is further configured to block communication with the host prior to configuration.

9. A method of configuring an intelligent peripheral, comprising:
   establishing a communication channel between a baseboard management controller and the intelligent peripheral;
   connecting the communication channel to a management network through the baseboard management controller;
   transmitting configuration information from the management network to the intelligent peripheral by the baseboard management controller; and
   wherein the baseboard management controller is further configured to transport data blocks from the management network to the intelligent peripheral using the communication channel.

10. The method of claim 9, wherein the intelligent peripheral is a smart network interface controller, and the method further includes providing network services to a host system using the smart network interface controller.

11. The method of claim 9, wherein the communication channel is a network controller sideband interface.

12. The method of claim 9, wherein connecting the communication channel to the management network includes providing a bridge between the communication channel and the management network.

13. The method of claim 12, further comprising providing initial configuration information to the intelligent peripheral through a BIOS configuration interface.

14. The method of claim 9, wherein connecting the communication channel to the management network includes routing network traffic between the communication channel and the management network.

15. The method of claim 9, further comprising blocking communication between the intelligent peripheral and the host until the intelligent peripheral is configured.

16. A method of configuring an intelligent peripheral, the method comprising:
   establishing a network controller sideband interface communication channel between a baseboard management controller and the intelligent peripheral;
   establishing communication between the baseboard management controller and a provisioning server through a management network;
   removing, by the baseboard management controller, network protocol headers from a network packet received from the provisioning server, and transmitting an enclosed data block to the intelligent peripheral through the network controller sideband interface communication channel; and
   receiving at the baseboard management controller a data block from the intelligent peripheral through the network controller sideband interface communication channel, and encapsulating the data block with network headers for transmission over the management network to the provisioning server; and
   wherein the baseboard management controller is further configured to transport the data blocks from the management network to the intelligent peripheral using the communication channel.

17. The method of claim 16, wherein the intelligent peripheral is a smart network interface controller, and the method further includes providing network services to a host system using the smart network interface controller.

18. The method of claim 16, further comprising blocking communication between the intelligent peripheral and the host until the intelligent peripheral is configured.

* * * * *